US008207975B1

(12) United States Patent
Molnar et al.

(10) Patent No.: US 8,207,975 B1
(45) Date of Patent: Jun. 26, 2012

(54) GRAPHICS RENDERING PIPELINE THAT SUPPORTS EARLY-Z AND LATE-Z VIRTUAL MACHINES

(75) Inventors: Steven E. Molnar, Chapel Hill, NC (US); Mark J. French, Raleigh, NC (US)

(73) Assignee: NVIDIA Corporation, Santa Clara, CA (US)

( * ) Notice: Subject to any disclaimer, the term of this patent is extended or adjusted under 35 U.S.C. 154(b) by 1021 days.

(21) Appl. No.: 11/959,441

(22) Filed: Dec. 18, 2007

Related U.S. Application Data

(63) Continuation-in-part of application No. 11/430,635, filed on May 8, 2006.

(51) Int. Cl.
*G06T 1/20* (2006.01)
*G06T 15/50* (2011.01)
*G06T 15/60* (2006.01)

(52) U.S. Cl. ........................................ 345/506; 345/426
(58) Field of Classification Search .................. 345/506, 345/426
See application file for complete search history.

(56) References Cited

U.S. PATENT DOCUMENTS

| | | | |
|---|---|---|---|
| 5,798,770 A | 8/1998 | Baldwin | |
| 6,222,550 B1* | 4/2001 | Rosman et al. | 345/419 |
| 6,734,861 B1 | 5/2004 | Van Dyke et al. | |
| 6,961,085 B2 | 11/2005 | Sasaki | |
| 6,999,076 B2 | 2/2006 | Morein | |
| 7,034,828 B1* | 4/2006 | Drebin et al. | 345/426 |
| 7,068,272 B1* | 6/2006 | Voorhies et al. | 345/422 |
| 7,633,506 B1* | 12/2009 | Leather et al. | 345/506 |
| 2004/0061699 A1 | 4/2004 | Tjew | |
| 2004/0119710 A1* | 6/2004 | Piazza et al. | 345/422 |
| 2004/0246260 A1* | 12/2004 | Kim et al. | 345/557 |
| 2005/0140684 A1* | 6/2005 | Buehler | 345/531 |
| 2005/0195198 A1* | 9/2005 | Anderson et al. | 345/506 |
| 2005/0280652 A1* | 12/2005 | Hutchins et al. | 345/557 |

(Continued)

FOREIGN PATENT DOCUMENTS

JP          09-050533          2/1997

(Continued)

OTHER PUBLICATIONS

Moya, et al. "Shader Performance Analysis on a Modern GPU Architecture," Nov. 16, 2005, Proceedings of the 38th Annual IEEE/ACM International Symposium on Microarchitecture (MICRO'05), pp. 355-364.

(Continued)

*Primary Examiner* — David T Welch
(74) *Attorney, Agent, or Firm* — Patterson & Sheridan, LLP

(57) ABSTRACT

One embodiment of the present invention sets forth a graphics pipeline architecture for optimizing graphics rendering efficiency by advancing the Z-test operation prior to shading operations whenever possible, as determined by an upstream pipeline configuration unit. Each processing engine within the graphics pipeline maintains independent state for both early Z-mode and late Z-mode operations and also may maintain state common to both modes. The processing engines receive work transactions that include a Z-mode flag indicating whether the work transaction should be processed in late Z-mode or early Z-mode. The Z-mode flag is also used to dynamically route any resulting outbound data, so that the appropriate data flow for either early Z or late Z processing is dynamically constructed for each work transaction. The shader engine is advantageously relieved of unnecessary work whenever possible by discarding occluded samples whose z-values are not altered by shading operations before they enter the shader engine.

20 Claims, 6 Drawing Sheets

U.S. PATENT DOCUMENTS

2007/0257905 A1* 11/2007 French et al. ............... 345/419
2007/0268289 A1* 11/2007 Yu et al. ..................... 345/422

FOREIGN PATENT DOCUMENTS

JP           2002-269583         9/2002

OTHER PUBLICATIONS

U.S. Appl. No. 11/430,635. Office Action Dated Mar. 27, 2009.
English Translation of JP 2002-269583 (provided as explanation of relevance).
English Translation of JP 09-050533 (provided as explanation of relevance).
Partial Translation of Office Action, JP App. No. 2007-123715, dated Dec. 28, 2009.
Fernando, Randima, "GPU Gems," Chapter 28, NVIDIA Corp., 2004.
Eggers, et al. "Simultaneous Multithreading: A Platform for Next-Generation Processors," IEEE Micro, vol. 17, No. 5, pp. 12-19, Sep./Oct. 1997.

* cited by examiner

GRAPHICS RENDERING PIPELINE THAT SUPPORTS EARLY-Z AND LATE-Z VIRTUAL MACHINES

CROSS-REFERENCE TO RELATED APPLICATIONS

This application is a continuation-in-part of U.S. patent application Ser. No. 11/430,635, entitled "Optimizing a Configurable Graphics Rendering Pipeline Using Early Z-Mode", filed May 8, 2006, with priority claimed for all commonly disclosed subject matter.

BACKGROUND OF THE INVENTION

1. Field of the Invention

Embodiments of the present invention relate generally to computer graphics and more specifically to a graphics rendering pipeline that supports early-Z and late-Z virtual machines.

2. Description of the Related Art

A graphics rendering engine commonly consists of a set of specialized processing engines organized in a dataflow-style pipeline. After any data fetch engines, the setup engine is commonly at the top of the graphics rendering engine. The setup engine operates on geometric primitives, such as triangles, and emits transformed or simplified representations of the geometric primitives to a raster engine. The raster engine determines pixel coverage associated with each geometric primitive, producing a sequential stream of unshaded pixel primitives with an associated depth value (Z-value). A shader engine operates on the sequential stream of unshaded pixels from the raster engine, producing a stream of shaded pixels. In addition to computing the color of a given pixel, some shader engines optionally generate or modify the Z-value of a pixel. A Z-raster operations (ZROP) engine determines if a new pixel should be saved or discarded through an operation called Z-testing. Z-testing compares a new pixel's depth and stencil data against previously stored depth and stencil data in the current depth buffer at the location of the new pixel. If a pixel survives Z-testing, the ZROP engine optionally writes the new pixel's depth and stencil data to the current depth buffer. A Z-resolve engine merges the results of Z-testing with latency buffered data associated with the associated pixel. The Z-resolve engine transmits pixels that have survived Z-test to a color raster operations (CROP) engine and discards pixels that have not survived Z-test. The color raster operations (CROP) engine updates and writes the new pixel's color data to the current color buffer.

The precise sequence of processing steps in a graphics rendering pipeline is commonly designed to accommodate the simplest reduction of sequential data dependence in the rendering process. For example, a triangle primitive should be rasterized into a pixel primitive before pixel operations are conducted on the set of pixels covered by the triangle. Additionally, a pixel's Z-value should be computed before being compared to previously computed Z-values in the depth buffer. Z-testing is commonly conducted after shading, since pixel or sample kills resulting from alpha testing, alpha-to-coverage operations, and shader-pixel-kill operations are specified to take place before the Z buffer is updated. Also, in some modes, the shader may compute Z-values.

As is well known, the shader engine is the most expensive element of the graphics rendering pipeline, consuming the most logic resources and the most power. Furthermore, complex shading algorithms commonly executed in the shader engine cause the shader engine to become the leading performance bottleneck in the graphics rendering pipeline. Early Z-culling in the raster engine achieves some performance gain by discarding primitives known to be occluded before work related to these primitives is triggered within the shader engine. However, early Z-culling is only a trivial discard mechanism and not a substitute for the more precise Z-testing. Even when early Z-culling is employed, the Z-testing step may discard half or more of the pixels processed by the shader engine. More importantly, the shader engine typically does not even modify the Z-values of many of the discarded pixels during shading operations, making the traversal of these pixels through the shader engine superfluous. Certain prior art systems provide a way to perform the Z test early, ahead of shading, if this can be done without altering the final image. In such systems, current state, optionally with a hysteresis mechanism, determines whether the pipe is configured to operate in early Z-mode (z testing performed ahead of the shader) or late Z-mode (z test performed after shader). When state changes such that a switch between early and late Z-modes is needed, either the shader or Z processing pipeline is flushed to prevent data hazards. The disadvantage of such prior art systems is that each flush associated with a Z-mode change can require several hundred clock cycles, making each flush a relatively costly operation in terms of efficiency and performance. Thus, applications that switch state rapidly either suffer performance degradation from needing to perform frequent flush operations, or simply operate in the less efficient late Z-mode to sidestep the issue altogether.

As the foregoing illustrates, what is needed in the art is a technique for improving efficiency in a graphics rendering pipeline when alternating between early Z-mode and late Z-mode operation.

SUMMARY OF THE INVENTION

One embodiment of the present invention sets forth a method for switching the processing mode of a graphics rendering pipeline between early Z-mode and late Z-mode. The method includes the steps of receiving a geometry primitive, receiving a plurality of work transactions associated with the geometric primitive, determining whether the work transactions should be processed in early Z-mode or late Z-mode, and setting a flag for each work transaction indicating whether the work transaction should be processed in early Z-mode or late Z-mode.

One advantage of the disclosed method is that, by processing in early Z-mode when appropriate, the shader engine is relieved of unnecessary work since occluded samples whose z-values are not altered by shading operations are discarded before they enter the shader engine. Another advantage of the disclosed method is that transitions between early Z-mode and late Z-mode (and vice-versa) do not require a flush of the shader or the z processing pipeline, and can therefore be done at high frequency with no performance disadvantage.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present invention improves the overall efficiency of a graphics rendering pipeline by reducing the workload on the shader engine, a well-known performance bottleneck of most graphics rendering pipelines. By dynamically reconfiguring the flow of data within the graphics rendering pipeline based on token type flags, the shader engine may be relieved of superfluous work common in prior art graphics rendering pipeline implementations.

Figure 1:
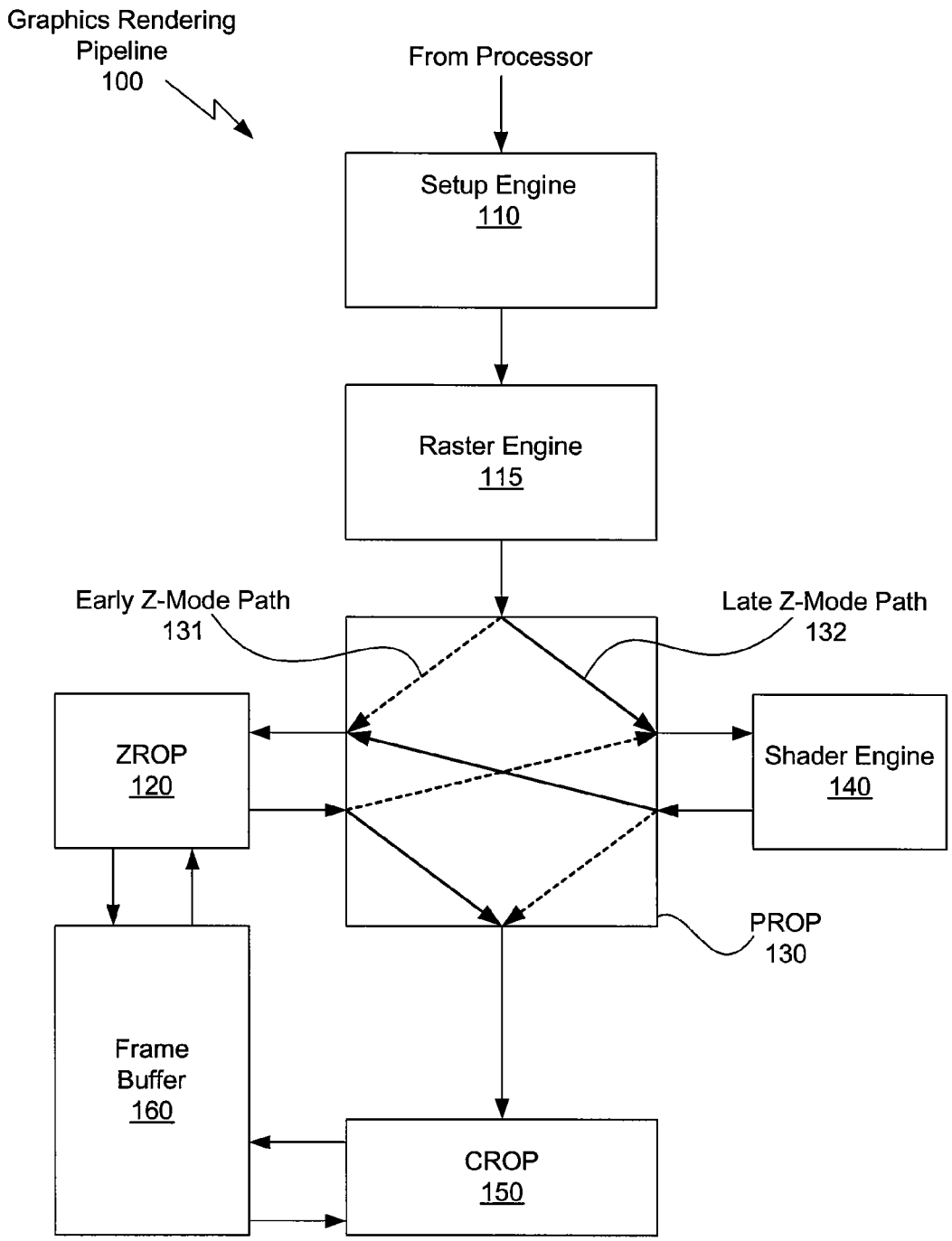
FIG. 1 is a conceptual diagram of a data flow through a graphics rendering pipeline, according to one embodiment of the invention.

FIG. 1 is a conceptual diagram of a data flow through a graphics rendering pipeline 100, according to one embodiment of the invention. As shown, a setup engine 110 receives geometric primitives from a driver executing on a processor (not shown). The setup engine 110 operates on incoming primitives and emits transformed and processed geometric primitives suitable for presentation to a raster engine 115. The setup engine 110 also operates on incoming commands containing "state bundles." A state bundle contains data that defines, without limitation, how subsequent graphics primitives are to be processed in the various processing units of the graphics rendering pipeline 100. Data from a state bundle may be retained in those processing units for later reference. The setup engine 110 tracks the rendering state in the graphics rendering pipeline 100 and coordinates certain changes therein. The rendering state includes, without limitation, the different variables, modes and settings associated with the rendering process at various points within the graphics rendering pipeline 100. Some rendering state variables, modes or settings are established prior to initiating the rendering process on a given primitive, whereas some rendering state is dynamically updated as the primitives progress through the graphics rendering pipeline 100.

The raster engine 115 computes the coverage of the geometric primitives and emits pixel primitives for further processing. Additionally, the raster engine 115 may compute an associated Z-value for each pixel.

A Z raster operations (ZROP) engine 120 compares Z-values for the current pixel primitives to previously stored Z-values for the corresponding pixel locations. The results from the ZROP engine 120 determine if the various pixel primitives are to be kept or discarded. More specifically, the ZROP engine 120 compares the Z-value of each pixel with the Z-value of the corresponding pixel location previously stored in a depth buffer (not shown). Again, the process is known as "Z-testing." If the current pixel passes Z-testing, then the ZROP engine 120 optionally writes the Z-value of the pixel to the depth buffer, which commonly resides in a frame buffer 160.

If the pixel does not pass Z-testing, then the pixel is discarded by a Z-resolve engine (not shown) that resides within a pre-raster operations (PROP) unit 130, and the ZROP engine 120 does not write any Z-value information to the depth buffer. As persons skilled in the art understand, in addition to Z-values determining the visibility of a pixel, stencil values may optionally be used in conjunction with Z-values in making a final determination of whether a particular pixel passes or fails Z-testing. Therefore, any reference herein to Z-values has applicability, where appropriate, to stencil values.

The shader engine 140 operates on the pixel primitives to compute, without limitation, color and Z-values for the pixels, as determined by the programming of the shader engine 140. A color raster operations (CROP) engine 150 writes, as determined by the results of Z-test in the ZROP engine 120, the color value of each passing pixel to the frame buffer 160.

The PROP unit 130 manages the flow of pixel primitives between the ZROP engine 120, the CROP engine 150 and the shader engine 140, sequencing the order of operations according to the state of the Z-mode flag included within each work transaction. As described herein, the PROP unit 130 directs data within discrete work transactions along one of two paths, corresponding to "late" Z-mode and "early" Z-mode processing models. A data flow path 132 for late Z-mode is shown in solid lines running through the PROP unit 130. In late Z-mode, the shader engine 140 first operates on a pixel primitive to calculate, without limitation, color and Z-values for the related pixel. The shader engine 140 directs the results to the ZROP engine 120 for Z-testing. As described above, the ZROP engine 120 updates the Z-values in the depth buffer for all pixels passing the Z-test and passes this information along to the Z-resolve engine within the PROP unit 130. The Z-resolve engine then discards all pixels that do not pass the Z-test and transmits the passing pixels to the CROP engine 150 for any remaining color and frame buffer updates.

Again, in many instances, the Z-values are not altered by the shader engine 140. Therefore, in the early Z-mode path, Z-testing is conducted before shading, thereby relieving the shader engine 140 from work associated with processing pixels that (i) have Z-values that are not altered by shading operations and (ii) are destined to be discarded through Z-testing. A data flow path 131 for early Z-mode is shown in dashed lines running through the PROP unit 130. Here, pixel primitives from the raster engine 115 are routed to the ZROP engine 120 for Z-testing and to the Z-resolve engine within the PROP unit 130 before being routed to the shader engine 140. Using the results of the Z-test, the resolve engine discards all pixels that do not pass the Z-test and then transmits the passing pixels to the shader engine 140 for shading operations. Importantly, since the shader engine 140 processes only pixels that survive Z-testing, the number of pixels processed in early Z-mode may be substantially reduced relative to the number of pixels processed in late Z-mode. After shading, the shader engine 140 transmits the shaded pixels to the CROP engine 150.

Whether a pixel primitive traverses the early Z-mode path or the late Z-mode path, Z-testing is generally required on all pixels. In the case of early Z-mode, the shader engine 140 is relieved of the computation associated with pixels that are discarded on account of Z-testing, resulting in improved system performance. In the case of late Z-mode, the shader engine 140 shades all pixels, regardless of the ultimate disposition of each pixel. Late Z-mode is the general case and accommodates all rendering states available in the graphics rendering pipeline 100; whereas, early Z-mode is restricted to certain frequently encountered rendering states and is selected opportunistically when eligible primitives are to be rendered.

The processing engines within the graphics rendering pipeline 100 include state information for both early Z-mode processing and late Z-mode processing. The early Z-mode state and late Z-mode state may include only fully independent state or may include a combination of independent state and certain common state. Independent state pertains to only one of the processing modes and is also referred to herein as "lightweight" state because a change of this state within a given processing engine may be executed without substantially impacting the other elements within the graphics rendering pipeline 100. Common state is state that both early Z-mode processing and late Z-mode processing utilize in the same way with rare changes. For example, state related to a specific render target may be common state. In contrast to independent state, common state is referred to herein as "heavyweight" state because a change to this state usually impacts a substantial number of the elements within the graphics rendering pipeline 100. A heavyweight state change may involve, for example, a complete or partial pipeline flush before the change in state is completed. When a processing engine receives a work transaction, the Z-mode flag is extracted from the data within the work transaction. If the Z-mode flag is set to "early Z-mode," then the processing engine uses the early Z-mode state (which may be a combination of independent and common state) to process the data within the work transaction. If, instead, the Z-mode flag is set to "late Z-mode," then the processing engine uses the late Z-mode state (which, again, may be a combination of independent and common state) to process the data within the work transaction.

Because of the resulting higher performance, early Z-mode is the preferred processing path for the graphics rendering pipeline 100. For each work transaction, the setup engine 110 determines whether a given primitive should be processed using the early Z-mode path or the late Z-mode path and then sets the flag for the work transaction, accordingly. In general, the setup engine 110 selects early Z-mode if the required rendering state of the current primitive indicates that the Z-value associated with a primitive is not going to be altered by the shader engine 140. As set forth below, early Z-mode may be implemented when certain specific rendering modes are encountered. In alternate embodiments, the mode determination performed by the setup engine 110 may be performed by a unit, such as a pipeline configuration unit, situated upstream of the shader engine 140 and ZROP engine 120 in the graphics rendering pipeline 100. For example, such a unit could be part of part of the setup engine 110 or could be a stand-alone element within the graphics rendering pipeline 100.

Specifically, there is one rendering state that generally indicates that late Z-mode processing should be used. This rendering state is associated with shader programs that compute or modify Z-values internally, evidenced in the pseudo code set forth below when DepthReplaceShader==true. Within the sets of other possible rendering states, there are two regimes in which early Z-mode is allowed. The first regime is defined as "EarlyZNoKill," in which shader and post-shader color operations do not affect fragment coverage. The second regime is defined as "EarlyZNoUpdate," in which Z-value writes are disabled to allow Z-testing to be performed prior to shading, even though Z-testing may be performed for pixels or samples whose coverage is later modified by the shader. The following pseudo code summarizes the conditions that should be met for early Z-mode processing. When the EarlyZEnable variable in the pseudo code is computed to be true, then the setup engine 110 sets the Z-mode flag to "early Z-mode" for each work transaction associated with the geometric primitive for which the EarlyZEnable variable is true. When the EarlyZEnable variable is computed to be false, then the setup engine 110 sets the Z-mode flag to "late Z-mode" for each work transaction associated with the geometric primitive for which the EarlyZEnable variable is false.

```
EarlyZGlobalOK =
    DepthReplaceShader          == false;   // shader does not compute
                                            or modify Z
EarlyZNoKillOK =                // shader does not affect fragment coverage
    AlphaTestEnable             == false &&
    AlphaToCovgEnable           == false &&
    ShaderPixelKillEnable       == false &&
    TextureColorKeyEnable       == false;
EarlyZNoUpdateOK =              // Z results not stored
    (DepthTestEnable            == false ||
    DepthWriteEnable            == false) &&
    (StencilTestEnable          == false ||
    (StencilMask                == 0x0) &&
    AllowEarlyZNoUpdate         == true;;
EarlyZEnable =                  // rendering state criteria for early Z-mode processing
    EarlyZGlobalOK &&
    (EarlyZNoKillOK || EarlyZNoUpdateOK);
```

The variables in the above pseudo code have the following defined meaning:

| | |
|---|---|
| DepthReplaceShader | The shader engine computes or modifies Z values (as opposed to interpolating vertex Z values normally); |
| AlphaTestEnable | The fragment alpha value is compared against a reference value, killing the fragment if the designated condition is not met; |
| AlphaToCovgEnable | The fragment alpha is converted into a sample coverage mask that is ANDed with the coverage mask computed by the raster engine; |
| ShaderPixelKillEnable | The fragment shader may kill fragments; |
| TextureColorKeyEnable | A color key comparison of texture values with a reference may kill fragments; |
| DepthTestEnable | Depth testing (Z buffering) is enabled; |
| DepthWriteEnable | Depth values that pass the depth test are written to memory; |
| StencilTestEnable | Stencil testing is enabled; and, |
| StencilMask | Bit mask indicating which stencil bits may be written to memory. |
| AllowEarlyZNoUpdate | Allow EarlyZNoUpdate mode. Unlike EarlyZNoKill mode, this mode may not always be a performance win, since Z tests may be performed for fragments that will be killed by the shader. |

Figure 2:
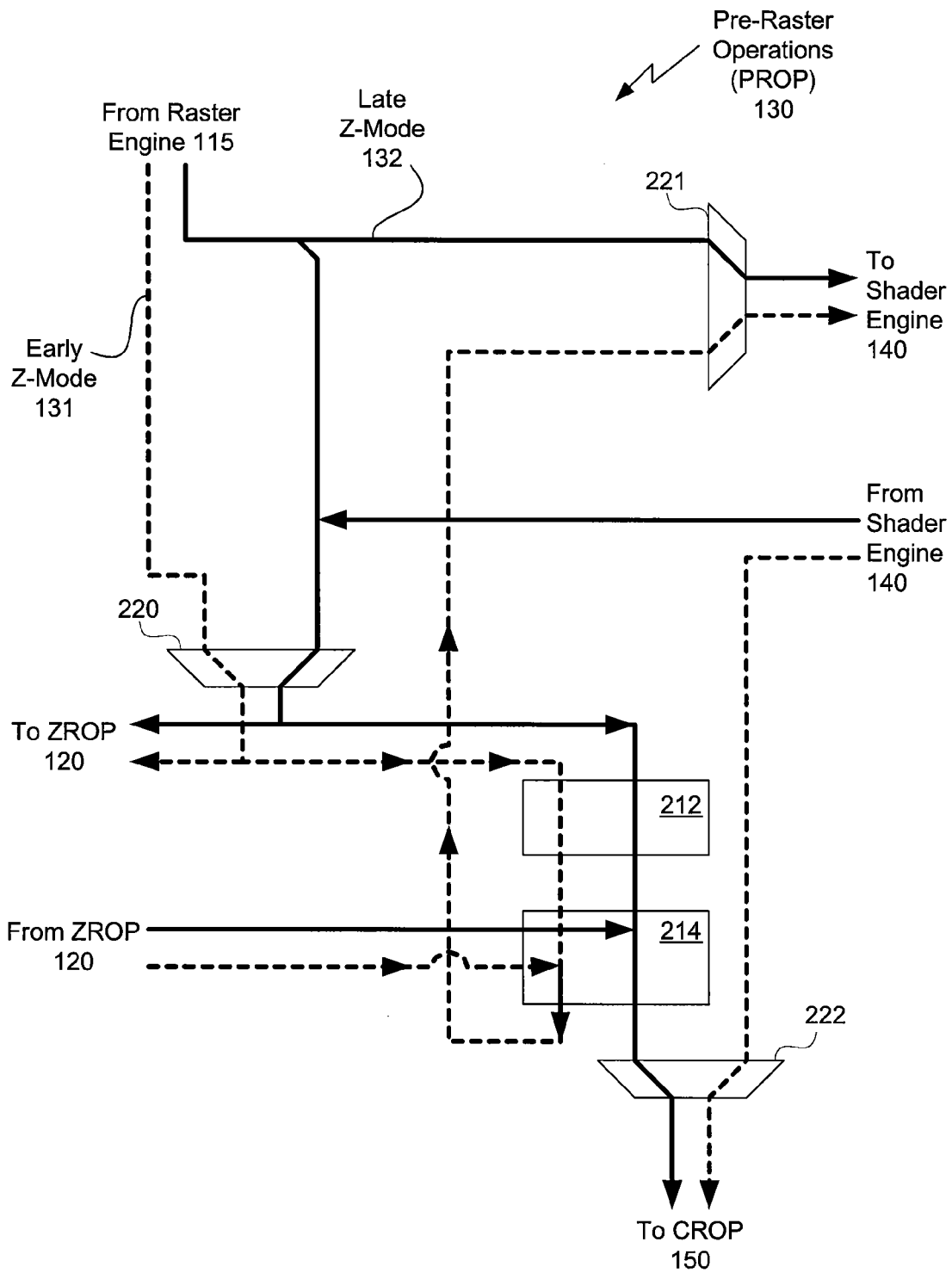
FIG. 2 is a conceptual diagram of a data flow through the PROP unit of FIG. 1, according to one embodiment of the invention.

FIG. 2 is a conceptual diagram of a data flow through the PROP unit 130 of FIG. 1, according to one embodiment of the invention. The Z-mode flag within each work transaction directs the flow of the work transaction, and the data included therein, through the PROP unit 130. The data flow path 132 for late Z-mode is shown in solid lines. For a late Z-mode work transaction including pixel data, the PROP unit 130 routes the pixel data from the raster engine 115 through a multiplexer 221 to the shader engine 140. The return data from the shader engine 140 is then sent through a multiplexer 220. The output of multiplexer 220 is routed to the ZROP engine 120 for Z-testing and to latency buffer 212 to accommodate the variable latency potentially exhibited by the ZROP engine 120. A Z-resolve engine 214 merges the results of the Z-testing performed by the ZROP engine 120 with the data passed through the latency buffer 212 to transmit or discard each shaded pixel. The shaded pixels that pass the Z-test are then selected by a multiplexer 222 and transmitted to the CROP engine 150 for final color processing, before being written to the frame buffer 160.

As with FIG. 1, the data flow path 131 for early Z-mode is shown in dashed lines. For an early Z-mode work transaction, the PROP unit 130 routes data from the raster engine 115 directly to multiplexer 220. Data transmitted by multiplexer 220 is routed to the ZROP engine 120 and to latency buffer 212 to accommodate the variable latency potentially exhibited by the ZROP engine 120. Again, Z-testing occurs within the ZROP engine 120. The Z-resolve engine 214 merges the results of the Z-testing performed by the ZROP engine 120 with data in the latency buffer 212 to transmit the pixels that pass the Z-test to the shader engine 140 for shading. The shaded pixels are then routed from the shader engine 140, through the multiplexer 222, to the CROP engine 150 for final color processing, before being written to the frame buffer 160.

Figure 3:
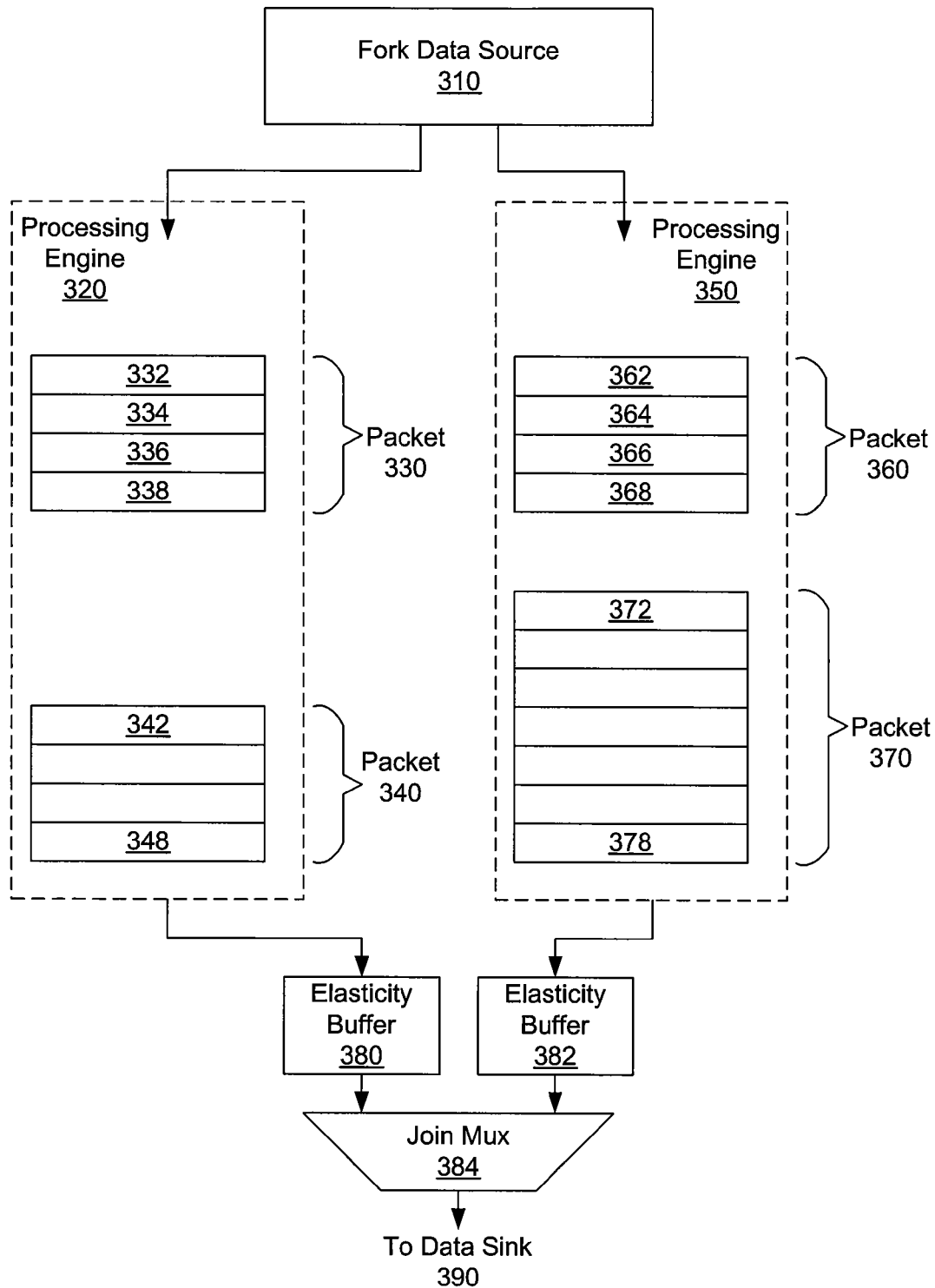
FIG. 3 illustrates a fork and join structure for controlling the data flow through the PROP unit of FIGS. 1 and 2, according to one embodiment of the invention.

FIG. 3 illustrates a fork and join structure for controlling the data flow through the PROP unit 130 of FIGS. 1 and 2, according to one embodiment of the invention. Two different paths are depicted in FIG. 2, the early Z-mode path 131 and the late Z-mode path 132. When alternating between early Z-mode and late Z-mode, the results from a given processing engine within the graphics rendering pipeline 100 may be transmitted to one of two different downstream processing engines depending on the mode of operation. Thus, data from one processing element may be transmitted to two different processing elements, resulting in a data fork. Similarly, data from two different processing elements may be received by and joined in a single processing element.

As shown, a fork data source 310 transmits data to two processing engines 320, 350. The fork data source 310 processes incoming data (not shown) that is structured as a sequence of work transactions. A set of related work transactions forms a packet. For example, work transactions 332, 334, 336 and 338 form packet 330, and work transactions 362, 364, 366 and 368 form packet 360. Each packet includes a first and a last work transaction. For example, work transaction 332 is the last work transaction within packet 330 and is marked with a "last" bit, while work transaction 338 is the first work transaction within packet 330. Work transaction 348 is the first work transaction of packet 340, and work transaction 342 is the last work transaction in packet 340. Similarly, work transactions 378 and 372 are the first and last work transactions, respectively, of packet 370. Graphics primitives are transported between functional units within the graphics rendering pipeline 100 using this mechanism of work transactions and packets.

Processing engine 320 transmits completed results to elasticity buffer 380, where data may be held for short spans of time prior to entering a join multiplexer 384. Processing engine 350 transmits completed results to elasticity buffer 382, where data may be held for short spans of time prior to entering the join multiplexer 384. The join multiplexer 384 selects data from one of the two elasticity buffers 380, 382. The selected data is then transmitted to a data sink 390. Importantly, the join multiplexer 384 stalls one elasticity buffer while accepting data from the other elasticity buffer. Persons skilled in the art will appreciate that, in alternative embodiments, any technically feasible flow control mechanism may be used to govern the data movement within the different fork and join structures present in the PROP 130.

In order to preserve the contiguous flow of work transactions that form a packet, the join multiplexer 384 should continue to select data from one source until the last work transaction for that packet is received. For example, if the join multiplexer 384 is receiving packet 370 through elasticity buffer 382, then the join multiplexer 384 should wait until the last work transaction 372 of packet 370 is received before receiving data from elasticity buffer 380. In other words, the join multiplexer 384 should stall elasticity buffer 380 until the last work transaction 372 is received. Once the last work transaction 372 is received through elasticity buffer 382, the join multiplexer 384 may select elasticity buffer 380 for input, stalling elasticity buffer 382, thereby receiving packet 340. Once the join multiplexer 384 begins to receive packet 340, the last work transaction 342 for packet 340 should be received before the join multiplexer 384 switches to receiving work transactions from elasticity buffer 382.

Figure 4A:
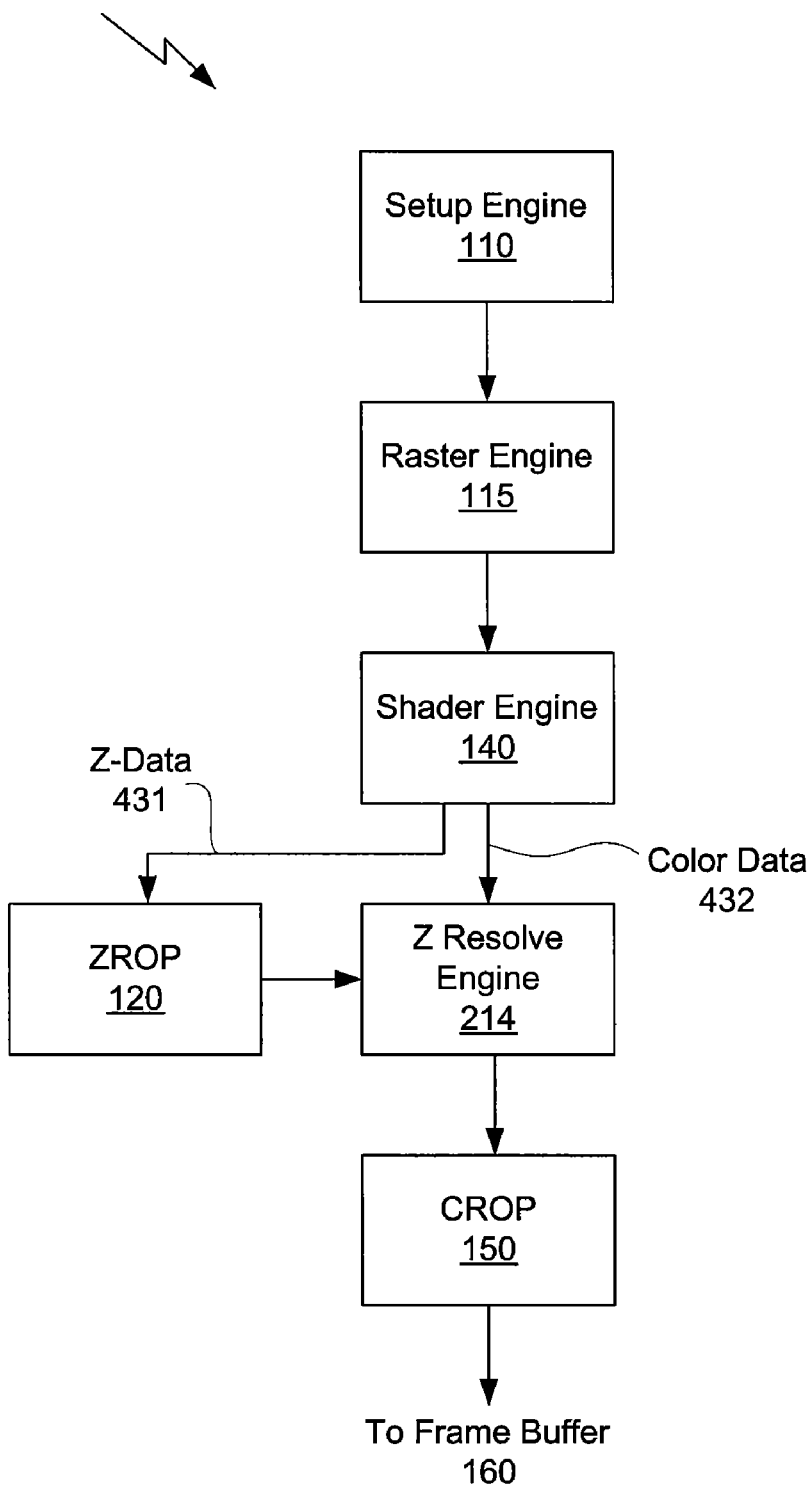
FIG. 4a illustrates the logical configuration of the graphics rendering pipeline of FIG. 1 for late Z-mode data, according to one embodiment of the invention.

FIG. 4a illustrates the logical configuration of the graphics rendering pipeline of FIG. 1 for late Z-mode data, according to one embodiment of the invention. The setup engine 110 operates on incoming primitives and emits transformed and processed geometric primitives suitable for presentation to the raster engine 115. The raster engine 115 computes the coverage of geometric primitives and emits pixel primitives to the shader engine 140. The raster engine 115 computes the Z-value of each pixel. The shader engine 140 computes, without limitation, pixel color values, and, optionally, Z-values, splitting the results between color data 432 and Z data 431 for further processing. The ZROP engine 120 implements Z-testing and communicates the results to the Z-resolve engine 214, which discards any pixels that do not pass the Z-test and transmits the pixels that pass the Z-test to the CROP engine 150. The CROP engine 150 saves the color values of the pixels transmitted by Z-resolve engine 214 to the frame buffer 160.

Figure 4B:
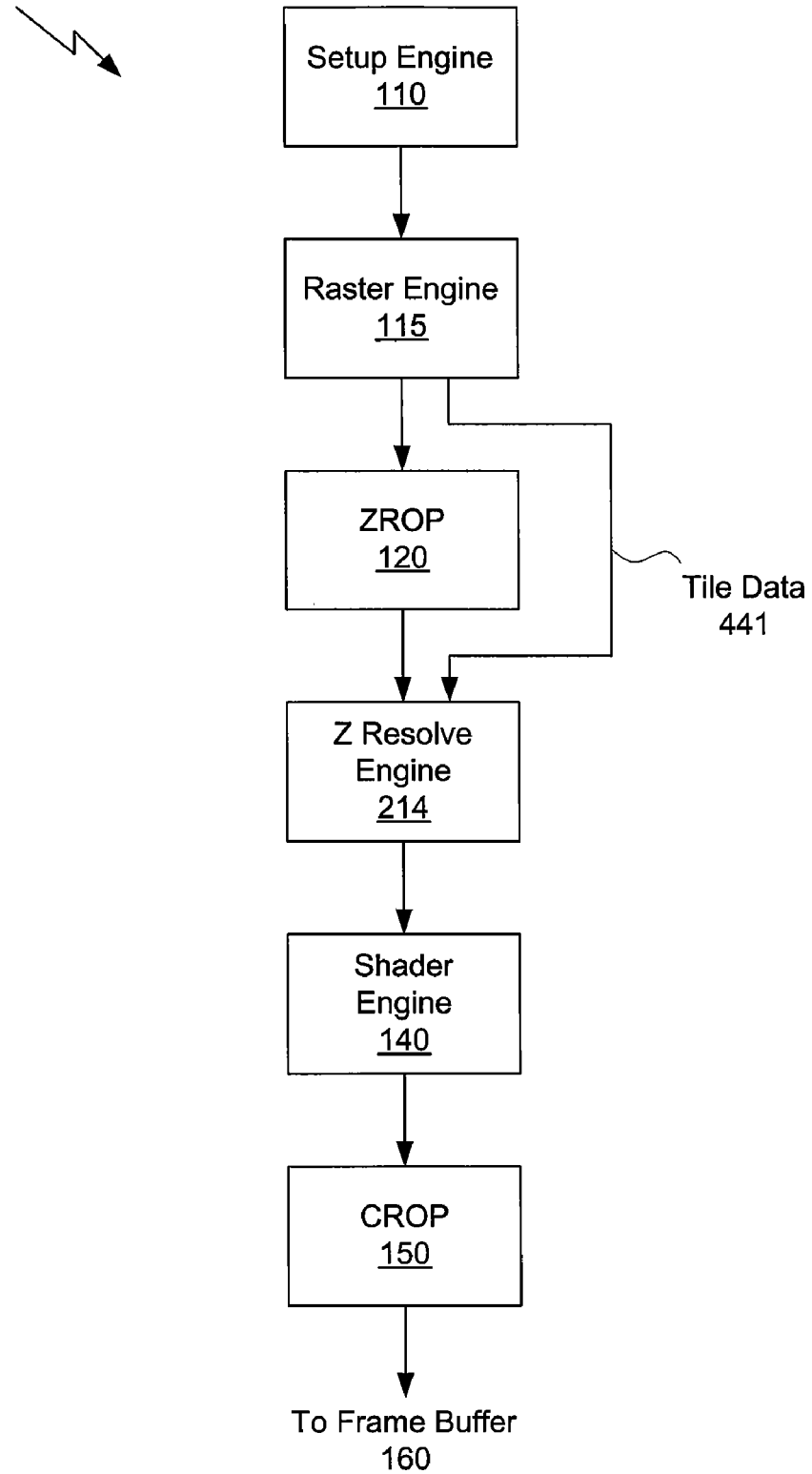
FIG. 4b illustrates the logical configuration of the graphics rendering pipeline of FIG. 1 for early Z-mode data, according to one embodiment of the invention.

FIG. 4b illustrates the logical configuration of the graphics rendering pipeline of FIG. 1 for early Z-mode data, according to one embodiment of the invention. As with late Z-mode, the setup engine 110 operates on incoming primitives and emits transformed and processed geometric primitives suitable for presentation to the raster engine 115. Unlike late Z-mode, however, the raster engine 115 computes the coverage of geometric primitives and emits the pixel primitives directly to the ZROP engine 120 for Z-testing. The raster engine 115 also communicates tile data 441, such as coverage information, to the Z-resolve engine 214. The ZROP engine 120 communicates the results of Z-testing to the Z-resolve engine 214, which transmits to the shader engine 140 only the pixels that pass the Z-test. Pixels discarded at this point by the Z-resolve engine 214 require no additional processing. The shader engine 140 computes pixel color values, and the CROP engine 150 saves the pixel color values to the frame buffer 160.

Flows depicted in FIGS. 4a and 4b result from the PROP unit 130 dynamically routing the data flow through the graphics rendering pipeline 100, as described in FIGS. 1 and 2. The PROP unit 130 is otherwise transparent to the operation of the graphics rendering pipeline 100 in both early Z-mode and late Z-mode and is therefore not shown in FIGS. 4a and 4b. The state associated with both pipeline configurations is maintained by each processing engine and selected for use based on the status of the Z-mode flag within a work transaction being processed.

Persons skilled in the art will recognize that, in some instances, a hazard condition may arise when two transactions related to the same (x,y) screen position appear in the transaction stream, where the first transaction in the stream is slotted for late Z-mode processing, and the second, subsequent transaction in the stream is slotted for early Z-mode processing. In such a situation, a risk exists that the second transaction could be processed before the first transaction, thereby violating the ordering semantics of the pipeline. Therefore, alternative embodiments may include a coverage-aware interlock mechanism configured to flush the pipeline whenever a transaction is received for early Z-mode processing that conflicts with a previous transaction slotted for late Z-mode processing.

Figure 5:
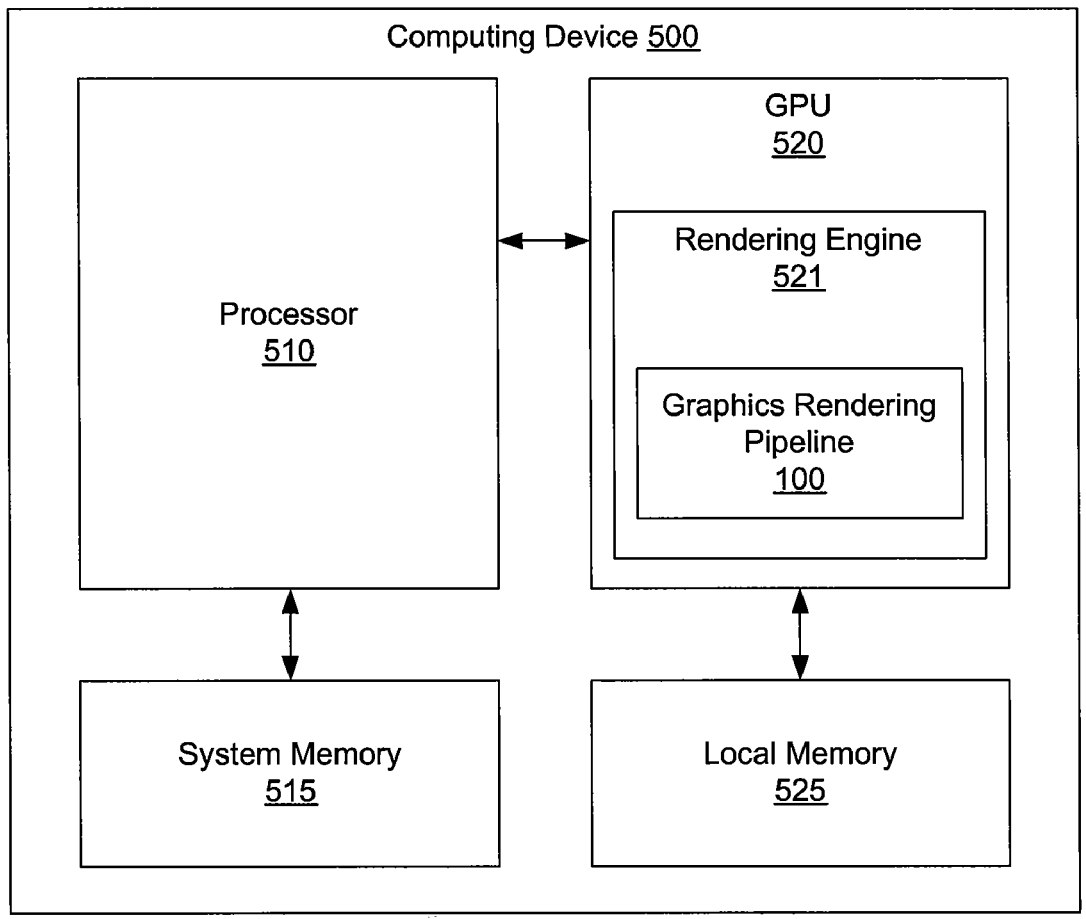
FIG. 5 is a conceptual diagram of a computing device configured to implement one or more aspects of the present invention.

FIG. 5 is a conceptual diagram of a computing device configured to implement one or more aspects of the present invention. The computing device 500 includes, without limitation, a processor 510, system memory 515, a graphics processing unit (GPU) 520 and local memory 525 connected to the GPU 520. The GPU 520 includes at least one rendering engine 521, which includes at least one graphics rendering pipeline 100 used to process data, as described herein. Persons skilled in the art will recognize that any system having one or more processing units configured to implement the teachings disclosed herein falls within the scope of the present invention. Thus, the architecture of computing device 500 in no way limits the scope of the present invention.

In sum, each processing engine within the graphics rendering pipeline may maintain independent state for processing early Z-mode data and for processing late Z-mode data. To conserve storage resources, state that is common to both early Z-mode and late Z-mode processing may be maintained as common state for both modes of processing. To further conserver storage resources, certain processing units that change state infrequently may employ only one set of state storage resources and cause some or all of the rendering pipeline to flush during a state change. Each processing engine examines a Z-mode flag within a work transaction and, depending on the state of the flag, processes the data within the work transaction in conjunction with either the state information for early Z-mode or the state information for late Z-mode. The resulting outbound data is then routed to the appropriate processing engine, again based on the state of the Z-mode flag for the work transaction. In this fashion, the appropriate data flow for either early Z-mode or late Z-mode processing is dynamically constructed for each work transaction. By maintaining independent state for early Z-mode and late Z-mode processing and by dynamically routing each work transaction accordingly, work transactions of both modes may be freely and simultaneously mingled within a graphics rendering pipeline. The ability to freely mingle early Z-mode and late Z-mode work transactions enables the graphics rendering engine to advantageously relieve the shader engine of unnecessary work whenever possible by discarding occluded samples whose z-values are not altered by shading operations before they enter the shader engine. Further, because the work transactions flow through the graphics rendering pipeline 100 in sequence according to whether those packets are processed in early Z-mode or late Z-mode, the number of pipeline flushes may be reduced since the setup engine 110 can send state information packets through the pipeline ahead of work transactions related to a particular primitive when only the independent state changes.

An additional benefit of the present invention is that the same functional units are utilized to process early Z data and late Z data, minimizing any additional hardware required for implementation.

While the foregoing is directed to embodiments of the present invention, other and further embodiments of the invention may be devised without departing from the basic scope thereof. For example, even though the above description focuses on pixel z-testing, the teachings of the present invention are just as applicable to z-testing of any form of sample (pixels, fragments, sub-pixels or any other form of color value representation). Therefore, the scope of the present invention is determined by the claims that follow.

We claim:

1. A graphics rendering pipeline for processing graphics primitives, the graphics rendering pipeline comprising:
   a raster engine configured to receive a geometry primitive and convert the geometry primitive into one or more pixel primitives, wherein at least one work transaction is associated with each pixel primitive;
   a shader engine configured to perform shading operations on one or more samples associated with a pixel primitive according to a Z-mode flag extracted from the at least one work transaction associated with the pixel primitive;
   a Z-raster operations (ZROP) unit configured to perform Z-testing on each of the samples according to the Z-mode flag extracted from the at least one work transaction associated with the pixel primitive;
   a Z-resolve engine configured to determine, for each sample, whether the sample is to be kept or discarded based on the Z-test results associated with the sample;
   a pre-raster operations (PROP) unit configured to modify a data flow path between the shader engine and the ZROP unit to support both early Z-mode and late Z-mode, wherein the PROP unit includes at least one fork and join structure that is configured to join two different data flow paths by selecting one of the two different data flow paths when a last work transaction for a packet is received; and
   a pipeline configuration unit upstream of the PROP unit configured to determine whether the at least one work transaction associated with the pixel primitive should be processed in early Z-mode or late Z-mode and to set the Z-mode flag within each work transaction indicating whether data included within the at least one work transaction associated with the pixel primitive should be processed in early Z-mode or late Z-mode;
   wherein the samples associated with the pixel primitive are processed first by the ZROP unit and the Z-resolve engine and then by the shader engine when the at least one work transaction associated with the pixel primitive has a Z-mode flag setting indicating that the at least one work transaction should be processed in early Z-mode, and the samples are processed first by the shader engine and then by the ZROP unit and the Z-resolve engine when the at least one work transaction associated with the pixel primitive has a Z-mode flag setting indicating that the at least one work transaction should be processed in late Z-mode.

2. The graphics rendering pipeline of claim 1, wherein the pipeline configuration unit is configured to evaluate a rendering state associated with the geometry primitive to determine whether the plurality of work transactions should be processed in early Z-mode or late Z-mode.

3. The graphics rendering pipeline of claim 1, wherein the pipeline configuration unit is configured to detect a change in independent state related to either early Z-mode or late Z-mode and transmit a state information packet through the graphics rendering pipeline prior to processing further work transactions.

4. The graphics rendering pipeline of claim 1, wherein the pipeline configuration unit is configured to detect a change in state common to both early Z-mode and late Z-mode and execute a flush operation prior to processing further work transactions.

5. The graphics rendering pipeline of claim 1, wherein the fork and join structure includes a fork data source coupled to a first processing engine configured for processing work transactions in early Z-mode and to a second processing engine configured for processing work transactions in late Z-mode.

6. The graphics rendering pipeline of claim 5, wherein the fork and join structure further includes a first elasticity buffer coupled to the first processing engine and a join multiplexer and configured for receiving processed work transactions from the first processing unit, and a second elasticity buffer coupled to the second processing engine and the join multiplexer and configured for receiving processed work transactions from the second processing unit, and wherein the join multiplexer is configured to stall the first elasticity buffer when receiving processed work transactions from the second elasticity buffer and to stall the second elasticity buffer when receiving processed work transactions from the first elasticity buffer.

7. The graphics rendering pipeline of claim 1, wherein the samples are pixels.

8. The graphics rendering pipeline of claim 1, wherein the packet includes a set of related work transactions and the last work transaction in the packet is marked with a "last" bit.

9. A computing device configured to process graphics primitives, the computing device comprising:
  a memory; and
  a processing unit that includes a graphics rendering pipeline having:
    a raster engine configured to receive a geometry primitive and convert the geometry primitive into one or more pixel primitives, wherein at least one work transaction is associated with each pixel primitive,
    a shader engine configured to perform shading operations on one or more samples associated with a pixel primitive according to a Z-mode flag extracted from the at least one work transaction associated with the pixel primitive,
    a Z-raster operations (ZROP) unit configured to perform Z-testing on each of the samples according to the Z-mode flag extracted from the at least one work transaction associated with the pixel primitive,
    a Z-resolve engine configured to determine, for each sample, whether the sample is to be kept or discarded based on the Z-test results associated with the sample,
    a pre-raster operations (PROP) unit configured to modify a data flow path between the shader engine and the ZROP unit to support both early Z-mode and late Z-mode, wherein the PROP unit includes at least one fork and join structure that is configured to join two different data flow paths by selecting one of the two different data flow paths when a last work transaction for a packet is received, and
    a pipeline configuration unit upstream of the PROP unit configured to determine whether the at least one work transaction associated with the pixel primitive should be processed in early Z-mode or late Z-mode and to set the Z-mode flag within each work transaction indicating whether data included within the at least one work transaction associated with the pixel primitive should be processed in early Z-mode or late Z-mode,
    wherein the samples associated with the pixel primitive are processed first by the ZROP unit and the Z-resolve engine and then by the shader engine when the at least one work transaction associated with the pixel primitive has a Z-mode flag setting indicating that the at least one work transaction should be processed in early Z-mode, and the samples are processed first by the shader engine and then by the ZROP unit and the Z-resolve engine when the at least one work transaction associated with the pixel primitive has a Z-mode flag setting indicating that the at least one work transaction should be processed in late Z-mode.

10. The computing device of claim 9, wherein the pipeline configuration unit is configured to evaluate a rendering state associated with the geometry primitive to determine whether the plurality of work transactions should be processed in early Z-mode or late Z-mode.

11. The computing device of claim 9, wherein the pipeline configuration unit is configured to detect a change in independent state related to either early Z-mode or late Z-mode and transmit a state information packet through the graphics rendering pipeline prior to processing further work transactions.

12. The computing device of claim 9, wherein the pipeline configuration unit is configured to detect a change in state common to both early Z-mode and late Z-mode and execute a flush operation prior to processing further work transactions.

13. The computing device of claim 9, wherein the fork and join structure includes a fork data source coupled to a first processing engine configured for processing work transactions in early Z-mode and to a second processing engine configured for processing work transactions in late Z-mode.

14. The computing device of claim 13, wherein the fork and join structure further includes a first elasticity buffer coupled to the first processing engine and a join multiplexer and configured for receiving processed work transactions from the first processing unit, and a second elasticity buffer coupled to the second processing engine and the join multiplexer and configured for receiving processed work transactions from the second processing unit, and wherein the join multiplexer is configured to stall the first elasticity buffer when receiving processed work transactions from the second elasticity buffer and to stall the second elasticity buffer when receiving processed work transactions from the first elasticity buffer.

15. The computing device of claim 9, wherein the samples are pixels.

16. The computing device of claim 9, wherein the packet includes a set of related work transactions and the last work transaction in the packet is marked with a "last" bit.

17. A method for switching the processing mode of a graphics rendering pipeline between early Z-mode and late Z-mode, the method comprising:
  receiving a geometry primitive;
  receiving a plurality of work transactions associated with the geometry primitive, wherein each work transaction includes a Z-mode flag and data;
  determining whether the work transactions should be processed in early Z-mode or late Z-mode; and
  setting the Z-mode flag within each work transaction indicating whether the work transaction should be processed in early Z-mode or late Z-mode;
  extracting the Z-mode flag from a work transaction;
  processing the work transaction using early Z-mode state or late Z-mode state based on the setting of the Z-mode flag associated with the work transaction;
  transmitting the work transaction to one of two processing engines based on the setting of the Z-mode flag;
  processing the work transaction in a first processing engine of the two processing engines and processing other work transactions in a second processing engine of the two processing engines; and
  joining the work transaction processed by the first processing engine with work transactions processed by the second processing engine by selecting an output of the first processing engine when a last work transaction for a packet is received from the second processing engine.

18. The method of claim 17, wherein the step of determining whether the work transactions should be processed in early Z-mode or late Z-mode comprises determining whether a rendering state indicates that one or more samples associated with the work transactions have Z-values that will not be modified during shading operations.

19. The method of claim 18, wherein the samples are pixels.

20. The method of claim 17, wherein the packet includes a set of related work transactions and the last work transaction in the packet is marked with a "last" bit.

* * * * *